June 2, 1942. L. A. BIXBY ET AL 2,285,106
TRANSMISSION
Filed Sept. 12, 1938 4 Sheets-Sheet 1

INVENTORS.
LEO A. BIXBY, ROBERT LAPSLEY.
BY Walter E. Schirmer
ATTORNEY.

Patented June 2, 1942

2,285,106

UNITED STATES PATENT OFFICE 2,285,106

TRANSMISSION

Leo A. Bixby, Niles, and Robert Lapsley, Berrien Springs, Mich., assignors to Clark Equipment Company, Buchanan, Mich., a corporation of Michigan Application September 12, 1938, Serial No. 229,407

20 Claims. (Cl. 192—48)

This invention relates to transmissions, and more particularly is directed to change speed transmissions employed in automotive vehicles such as passenger cars, trucks, busses and the like.

It has become increasingly prevalent to employ synchronizing means on the main shaft of the transmission for effecting synchronization of the shifting clutch and the gears with which it meshes prior to completion of the clutch engagement. Such synchronizing means have taken many forms but in the main, consist of friction members for bringing the two relatively moving parts to substantially synchronous speed and then allowing completion of the clutch shifting movement to positively lock the two members for conjoint rotation.

However, considerable difficulty has been experienced in transmissions of the type requiring three or four change speed gear ratios in effecting the shifting due to the inertia of rotation of the gears carried by the countershaft, which are in constant meshing engagement with certain of the main shaft gears.

In the majority of conventional transmissions which are now in use, the clutch shaft has a gear portion formed at the end thereof within which the main transmission shaft is journalled. This gear portion on the clutch shaft is usually in constant meshing engagement with a relatively large diameter gear on the countershaft, and consequently the inertia of rotation of this large gear and countershaft must be overcome to provide for effective shifting movement without any possibility of clashing gears and without requiring undue shifting force. In some transmissions this is of extreme importance as the countershaft gears are formed as a compound gear element having a relatively high mass or are all keyed to a shaft so that the rotation of one requires the conjoint rotation of all of the remaining gears.

It is a primary object of the present invention to provide means automatically operable upon disengagement of the clutch for shifting movement for declutching this main countershaft gear from the countershaft to provide for free rotation thereof with the clutch shaft without requiring rotation of either the countershaft or any of the other gears thereon.

It is another object of the present invention to provide means operated by the clutch pedal for initially disengaging the vehicle clutch between the power plant and the transmission, and for then declutching the countershaft from the main countershaft gear to facilitate shifting movement. The clutch pedal, upon initial movement toward engaging position, first reclutches the main countershaft gear to the countershaft, and subsequently engages the vehicle clutch for transmitting driving torque to the transmission.

Another feature of the present invention is the provision of means carried by the countershaft for synchronizing the rotation between the main countershaft gear and the countershaft prior to positive clutch engagement therebetween.

Another object of the present invention is to provide either mechanically or pneumatically actuated means for effecting the de-clutching and clutching operation at the countershaft, which are under the automatic control of the clutch pedal whereby no separate control or actuating means requires attention on the part of the operator.

The use of power shift mechanisms for transmissions has become increasingly prevalent, and to accommodate our invention thereto we have devised an interlocking mechanism actuated by the operation of the clutch pedal, and controlled through the power shift mechanism for insuring that a predetermined sequence of operations is followed whenever the gears are to be shifted. This sequence, controlled by the interlock mechanism, requires that the main clutch be first disengaged, then the countershaft clutch be disengaged, and then the shifting clutch be disengaged for shifting movement, upon depression of the clutch pedal. After the power shift mechanism has effected the desired shifting movement, the clutch pedal can be released to a position where the countershaft clutch is reengaged and then further released to reengage the main clutch.

Various other features of the present invention will be more apparent from the following detailed description which, taken in conjunction with the accompanying drawings, will disclose to those skilled in the art the particular construction and operation of preferred forms of the present invention.

Figures 1, 3:
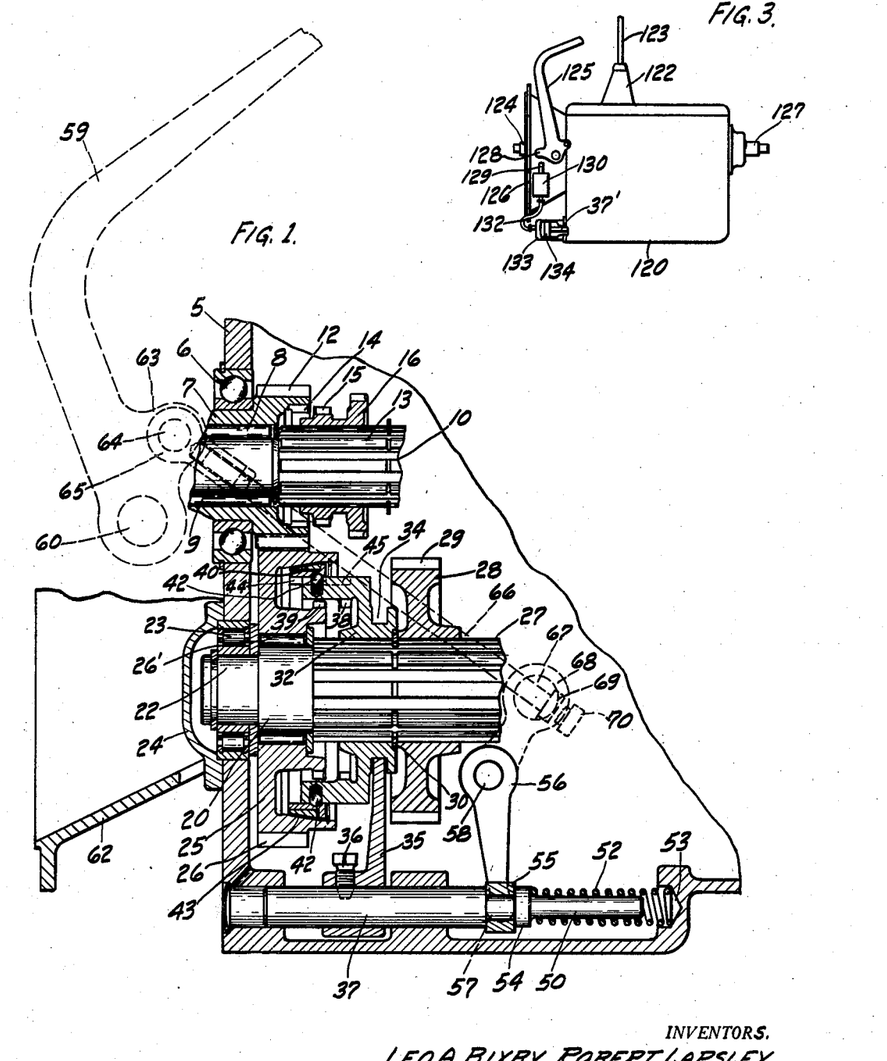
Figure 1 is a sectional view through a portion of the transmission showing the operating mechanism for clutching and declutching the countershaft.
Figure 3 is an elevational view partly in section, showing a modified form of actuating connection between the clutch and the countershaft shifting fork.

Referring now in detail to the embodiment of the invention shown in Figure 1, a transmission case is indicated generally at 5 and includes a bearing assembly 6 which provides a support for the outer end of the clutch shaft 7, which is axially recessed to receive the roller bearings 8 for piloting the reduced end 9 of the main transmission shaft therein. The clutch shaft 7 is provided at its end with an expanded gear portion 12 which is radially spaced from the splined portion 13 of the main transmission shaft 10, and is provided with internal clutch teeth 14 adapted to be engaged by the clutch teeth 15 of the clutch member 16 mounted for axial sliding movement upon the splined portion 13 of the main transmission shaft.

The clutch member 16 is actuated by any suitable shifting means for moving it axially in one direction to clutch the shaft 10 to the shaft 7 to effect direct drive through the transmission, and movable in the opposite direction to clutch a second gear carried by the shaft 10 but not shown to the shaft for effecting a different change speed drive.

Mounted in a radially offset position in the transmission housing is a countershaft 20 which has its reduced end 22 journalled in the roller bearing assembly 23 carried in the transmission housing and retained in place by the bearing cap 24.

The countershaft 20 has rotatably mounted thereon the main countershaft gear 25 which is rotatably supported by means of the roller bearings 26' about an annular shoulder formed on the countershaft, and the gear 25 is provided with a gear portion 26 adapted to have meshing engagement with the gear portion 12 of the clutch shaft 7. The countershaft 20 has a splined portion 27 spaced axially from the shoulder about which the gear 25 is mounted, and the splined portion 27 is adapted to receive the gear member 28 which is locked thereto for conjoint rotation, and which has a gear portion 29 adapted to have meshing engagement with a gear mounted on the main shaft 10.

A suitable ring 30 is provided in the splined portion 27 of the shaft 20 for retaining the gear 28 against axial movement in one direction. Beyond the ring 30 there is provided a clutch hub 32 mounted for sliding axial movement on the countershaft and in splined engagement therewith. The hub 32 has an annular groove 34 within which is engaged a shifter fork 35 that is rigidly secured by means of the set screw 36 to a shift rail 37 mounted in suitable journal bosses in the transmission case 5.

The clutch hub 32 is provided with internal clutch teeth 38 which are adapted to have meshing engagement with the clutch teeth 39 formed on the gear 25. However, the clutch 32 also carries the tapered synchronizing member 40 which is held in position thereon by the spring-pressed ball member 42. The synchronizing cone 40 is adapted to have frictional engagement with a similar conical surface 43 formed on an overhanging part of the gear 25 adjacent the gear teeth 26. The axial movement of the clutch 32 toward the gear 25 results in initial frictional engagement between the surfaces 40 and 43 whereby the countershaft is brought into synchronized rotation with the gear 25 driven from the clutch shaft 7, and as these two surfaces approach synchronous speed, the camming action produced between the depending portion 44 of the ring 40 and the recess 45 in the clutch allows the balls 42 to be depressed so that the clutch 32 may move relative to the member 40 to engage the clutch teeth 38 and 39 for positively locking the gear 25 and the countershaft 20 together for conjoint rotation.

The synchronizing portion of the clutch 32 may be of any conventional construction and is illustrated in the present invention only as showing one form of synchronizing mechanism, but it is to be understood that any type of mechanism of this type can be employed for the purpose of initially bringing the gear 25 and shaft 20 to synchronous speed prior to positive engagement of the clutch teeth 38 with the clutch teeth 39.

The shift rail 37 is provided with an extending portion 50 of reduced diameter about which is coiled a spring member 52 biased in a recess 53 in the transmission housing at one end, and at its opposite end is biased against a collar 54 formed on the shift rail. The spring 52 normally urges the rail to the left, as viewed in Figure 1, thereby tending to force the clutch 32 into clutching engagement. Mounted on the shift rail 37 is a suitable yoke nut 55 with which is engaged the lower end of a bell crank 56 as indicated at 57. The bell crank 56 is mounted about a fixed pivot 58 for oscillating movement in accordance with the actuation of a clutch pedal, indicated diagrammatically at 59. This clutch pedal is mounted for pivotal movement on a shaft 60 which controls the operation of the clutch carried within the bell housing 62 bolted to the flywheel housing of the power plant. The clutch pedal 59 is provided with an offset portion 63 adapted to carry a pin 64 about which is mounted the arm 65. This arm has a threaded socket adapted to receive a connecting rod 66 which is locked thereto, and which at its lower end is adapted to extend through a sleeve 67 rotatably mounted in the end 68 of the bell crank lever 56. At its lower end the rod 66 is provided with a headed portion 69, and the sleeve 67 is provided with a flatted portion against which the portion 69 is adapted to engage, whereby depression of the clutch pedal results in counterclockwise rotation of the bell crank 56 about its pivot 58 thereby moving the shift rail 37 to the left to declutch the clutch 32 from the gear 25.

The structure as shown in Figure 1 is illustrated in declutched position with the clutch pedal depressed to its fullest extent. Upon initial release of the clutch pedal the rod 66 will move downwardly, thereby allowing the bell crank 56 to move in a clockwise direction under the influence of spring 52. This moves the clutch 32 toward the gear 25, and upon the gear 25 and synchronizing ring 40 being brought into synchronism, the teeth 38 and 39 are engaged to lock the countershaft and gear together for conjoint rotation. However, the clutch pedal 59 at this time has not moved a sufficient distance to effect engagement of the main clutch between the engine and transmission. Further, release of the clutch pedal results in lost motion between the rod 66 and the bell crank 56 due to the fact that the spring 52 has already moved the rail 37 into its shifted position and the bell crank 56 can have no further movement in a clockwise direction. The rod 66 therefore moves through the sleeve 67 and projects therefrom as indicated in dotted lines at 70. It is therefore apparent that the clutching of the main countershaft gear to the countershaft will be effected prior to clutching engagement of the main clutch between the engine and transmission. Similarly, when it is desired to shift gears, initial depression of the clutch pedal 59 results in disengagement of the main clutch prior to actuation of the bell crank for disengaging the countershaft clutch. Thus the pedal during its downward movement successively effects disengagement of the two clutches, and in its upward movement successively effects engagement of the two clutches whereby the countershaft gear is not declutched from the countershaft except at such times that the main clutch has already been disengaged, and this gear is always reclutched to the countershaft prior to re-engaging of the main clutch.

By providing for disengagement of the gear 25 from the countershaft, it will be apparent that the inertial rotation of this gear with all of the countershaft gears is eliminated, and consequently it is not necessary to overcome the inertia of rotation of all of these members during the shifting movement effected by the clutch member 16 or at other clutches on the main shaft of the transmission. This reduces, to a considerable extent, the effort necessary to effect shifting, and insures that the shifting will be accomplished without clashing of gears due to the inertia of rotation of the countershaft gear. As a result, less power is required to effect this shifting movement, and further, the operation of the countershaft clutch is entirely independent of the operator and is automatically controlled by the clutch pedal which, of necessity, must be depressed for every shifting movement. It is therefore believed that this countershaft clutch controlled shifting mechanism facilitates, to a great extent, the shifting of gears in change speed transmissions, and also facilitates the engagement and disengagement of such gears without clashing or the like.

Figure 2:
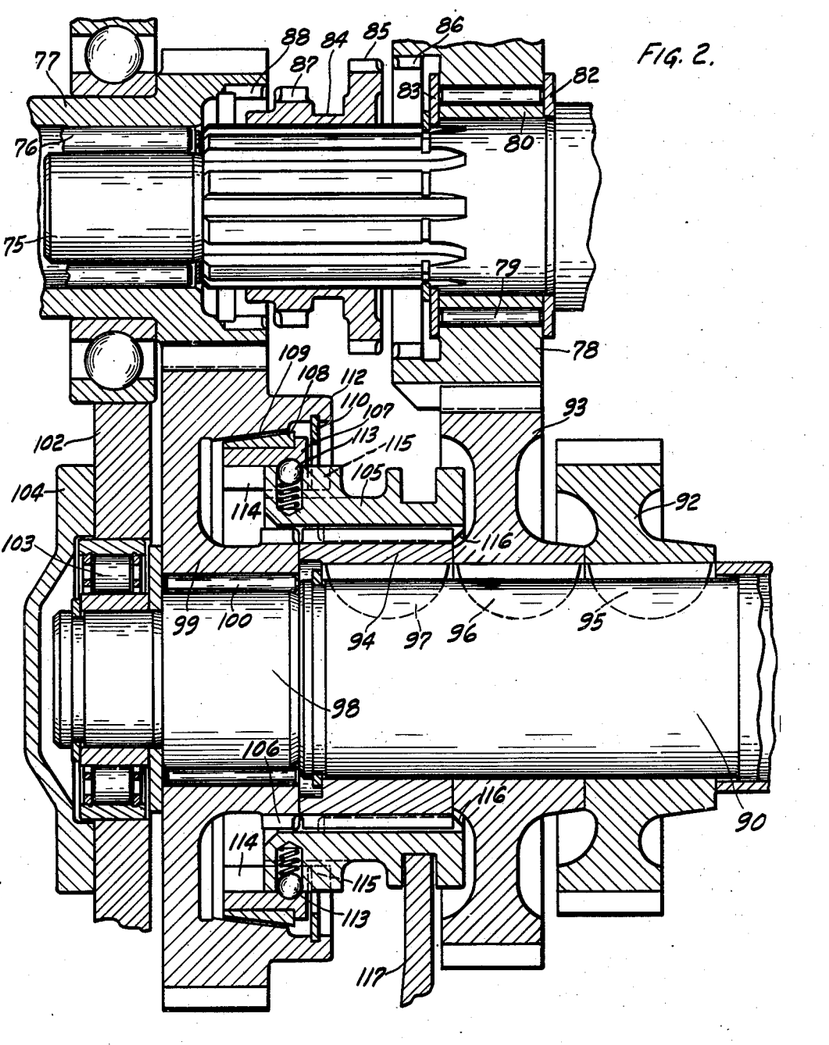
Figure 2 is an enlarged sectional view of a modified form of clutch member.

Considering now the embodiment of the invention shown in Figure 2, the main difference between this structure and the transmission shown in Figure 1 resides in the countershaft and clutch structure. The main transmission shaft 75 is piloted by the bearings 76 within the end of the clutch shaft 77, and carries thereon a gear 78 which is rotatably mounted by the bearings 79 upon a bushing 80 locked by the thrust washers 82 and 83 against axial movement on a shoulder portion of the main transmission shaft 75. The shifting clutch member 84 is adapted to selectively lock the gear 78 to the shaft 75 through the teeth 85 and 86, or in its other limiting position locks the shaft 75 to the clutch shaft 77 through the teeth 87 and 88. This is more or less a conventional construction and forms no part of the present invention.

The countershaft is indicated generally at 90, and has mounted thereon suitably gears 92, 93 and 94 by means of the keys 95, 96 and 97, respectively. The shaft 90 is provided with a reduced portion 98 upon which is rotatably supported the gear 99 by means of the bearings 100. This gear 99 is in constant meshing engagement with the clutch shaft 77, while the gear 93 is in constant meshing engagement with the gear 78 rotatably carried on the main transmission shaft 75.

The countershaft at one end is rotatably journalled in the transmission housing 102 by means of the bearing assembly 103 retained in position by the bearing cap 104. Mounted about the gear 94 is a clutch hub 105 having internal gear teeth in constant meshing engagement with the gear 94 and slidable axially relatively thereto. The gear 99 has a clutch tooth portion 106 of the same pitch diameter as the gear teeth on the gear 94, whereby axial sliding movement of the clutch 105 will result in connecting the gear teeth 106 to the gear 94 to produce conjoint rotation of the gear 99 and the shaft 90. Mounted on the shaft 105 is an annular ring 107 carrying the frusto-conical synchronizing ring 108 which is adapted to have frictional engagement with a frusto-conical surface 109 formed on the gear 99. A suitable stop ring 110 which is snapped into engagement about the projecting portion 112 of the gear 99 limits outward movement of the ring 107 relative to the gear 99. The ring 107 is provided with recessed portions about its inner surface adapted to be engaged by the balls 113 for normally holding the ring against movement relative to the clutch 105. However, when the ring and friction member 108 carried thereby are pressed into engagement with the surface 109, and the surfaces 108 and 109 come into substantially synchronous speeds with no relative movement therebetween, the cam surfaces on the depending lug portions 114 of the ring 107 produce reactions against corresponding cam surfaces 115 formed in the clutch 105, which releases the detent engagement of the balls 113 and allows the clutch 105 to move axially relative to the ring 107 to move the gear teeth 116 thereof into locking engagement between the gear 94 and the clutch teeth 106 of the gear 99. This results in locking the gear 99 and the shaft 90 for conjoint rotation. The movement of the clutch 105 is controlled by a shifter fork 117 which may be operated in a manner similar to the shifter fork 35 of Figure 1, or any other suitable or desired manner. However, it is desirable that the actuation of the shifter fork be controlled automatically by the clutch pedal so that clutching and declutching of the countershaft and the countershaft main gear will be effected during a period in which the main clutch is disengaged.

In Figure 3 we have disclosed a modified form of the invention in which pneumatic means are employed for effecting operation of the shift rail 37 or of the corresponding shift rail upon which the shifter fork 117 of the embodiment shown in Figure 2 may be mounted. In the transmission shown in Figure 3 the transmission housing is indicated at 120 and is provided with a suitable pedestal 122 in which is supported the gear shift lever 123 in any well known manner. The main clutch shaft is indicated at 124 and the clutch pedal is shown at 125 pivoted on the side of the bell housing 126 for controlling the clutch between the engine and the power transmission. The output shaft of the transmission is indicated at 127 and constitutes the main transmission shaft, the opposite end of which is journalled within the clutch shaft at 124. The clutch pedal 125 is provided with an offset extension 128 to which is suitably related a plunger element 129 operating within a cylinder 130. Upon depression of the clutch pedal, the plunger is adapted to build up pressure in the cylinder 130, which pressure is transmitted through the flexible conduit 132 into the end of a cylinder 133 in which is mounted a piston 134 to which is connected a shift rail such as indicated at 37'. Thus, as the clutch pedal is depressed, the pressure built up in the cylinder 130 will act against the outer end of the piston 134 to effect shifting movement of the shift rail for declutching the countershaft from the countershaft main gear. As the clutch pedal is released, initial release thereof will reduce the pressure in cylinder 133 to thereby allow the spring on the countershaft clutch shift rail to re-engage the countershaft clutch prior to the engagement of the main clutch within the main housing 126. It will be noted that the clutch pedal 125, as shown in Figure 3, is in the clutch engaged position and that the extension 128 is disposed a slight distance above the end of the plunger 129, thereby providing for sufficient movement of the clutch pedal 125 to effect disengagement of the main clutch prior to engagement of the extension 128 with the plunger 129. Similarly, the plunger 129 will be released to release the pressure in cylinder 133 prior to movement of the clutch pedal into position to effect re-engagement of the main clutch. Thus, it will be seen that by this arrangement the operation of the countershaft clutch is effected only during such times as the main clutch is in disengaged position.

In Figures 4 to 8, inclusive, we have disclosed a preferred form of interlock mechanism to be associated with any of the conventional types of power shift mechanism for definitely controlling the desired sequence of operations when a shift is to be made.

This interlock mechanism may be mounted in any convenient position between the power shift actuator and the transmission, and is designed to produce a predetermined sequence of control of steps during each shifting movement upon actuation of the clutch pedal such that there will be no possibility of clashing of gears or the like during shifting.

While the power shift mechanism is not disclosed herein, it is to be understood that such mechanism may be of any desired type, and may comprise suitable shiftable means for actuating valves to control the actuation of plungers connected to the shift rails of the transmission with independent interlocking mechanism controlling the actual shifting of gears in the transmission from one speed ratio to the other. The present interlocking mechanism is intended to tie in with such a power shift mechanism to the extent of insuring that the main shaft clutch and countershaft clutch will be selectively declutched and reclutched in predetermined sequence during shifting operations by the power shift.

Figure 4:
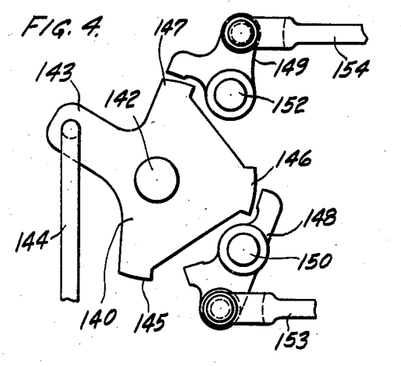
Figure 4 is a diagrammatic view of the interlock mechanism in normal driving position.
Figure 5:
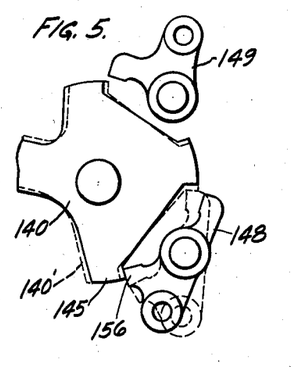
Figure 5 shows this mechanism upon movement of the clutch pedal to a position in which the main clutch has been disengaged.

Considering now in detail the structures shown in Figures 4 to 8, the main actuator member is indicated at 140 and suitably mounted for rotation about a pivot 142. An extending arm 143 on this member is suitably connected through the rod 144 to the clutch pedal so that depression of the clutch pedal results in counter-clockwise rotation of the actuator 140 about the pivot 142, as viewed in Figure 4. The actuator 140 is provided with spaced abutments 145, 146 and 147 about the periphery thereof, which abutments are adapted to have cooperating engagement with suitable stop members 148 and 149 pivoted respectively on fixed pivots 150 and 152. The stop member 148 has the clevis 153 connected thereto, which in turn is connected in any suitable manner to the countershaft shift rail, such as the rail 37 of Figure 1. The stop member 149 has a suitable clevis 154 connected thereto which, at its opposite end, is connected in any suitable manner to the clutch member 15 of Figure 1 or the clutch member 84 of the embodiment shown in Figure 2 whereby the stop member 149 is disposed in the position shown in Figure 4 whenever the gear members are in any change speed driving engagement. The member 148 is in the position shown when the countershaft is clutched to the gear 25 of Figure 1, and thus the entire mechanism as shown in Figure 4 is illustrated in a position under normal driving conditions with the car in any of its desired speed ratios.

When it is desired to effect a shift of gears, the power shift mechanism is actuated to position the power shift for engaging another gear ratio, which engagement of course is not effective until the clutch pedal has been actuated. Upon actuation of the clutch pedal, the actuator 140 moves from the position shown in Figure 4 to that shown in dotted lines at 140' in Figure 5. At this position, the pedal has been depressed sufficiently to disengage the main clutch between the engine and transmission, and as the pedal is moved to the position shown in full lines in Figure 5, the actuator 140 moves into position where the stop 145 abuts against the stop surface 156 of the stop member 148. In this position the actuator 140 has moved to a position where any suitable mechanism on the power shift control is actuated to operate a valve for actuating the shift rail 37 for releasing the countershaft from the clutch shaft. This results in movement of the shift rail 37, which, through the clevis connection 153, results in moving the stop member 148 into the dotted line position shown in Figure 5. This movement releases the abutment between the portion 156 of the member 148 and the stop 145 of the actuator 140, thereby allowing the actuator to move past the stop 156 into the position shown in Figure 6. It will be understood that at this time the countershaft clutch rail has been moved into declutching position, and remains in such position during the movement of the actuator 140 to the position shown in Figure 6. As the actuator moves in the position shown in Figure 6, suitable means at the power shift mechanism is actuated to declutch the main transmission shaft clutch or to move the gears into neutral position. At this time the clutch pedal has been entirely depressed due to the release of the abutment between the portion 156 and the stop 145, and as the gears in the transmission are shifted to neutral position, the stop member 149 is moved from the position shown in Figures 4 and 5 into the dotted line position shown in Figure 6, which moves the abutment 158 thereof into a position within the stop 147. Release of the clutch pedal will not allow the pedal to move back from fully depressed position due to the fact that the abutment 158 lies within the path of the stop 147, and consequently prevents any clockwise movement of the actuator 140.

Figure 6:
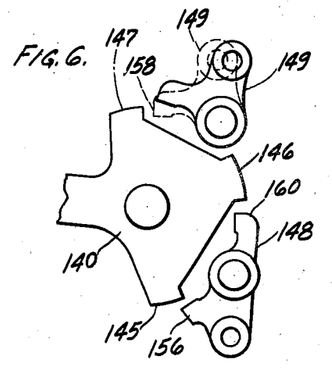
Figure 6 illustrates the interlock mechanism in position after disengagement of the countershaft clutch.
Figure 7:
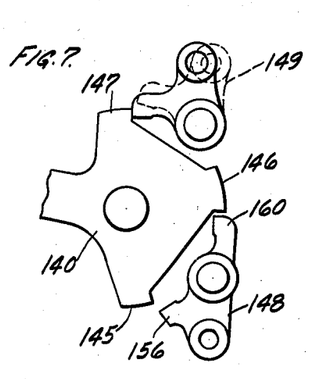
Figure 7 illustrates the position of the mechanism during power shifting of the gears.
Figure 8:
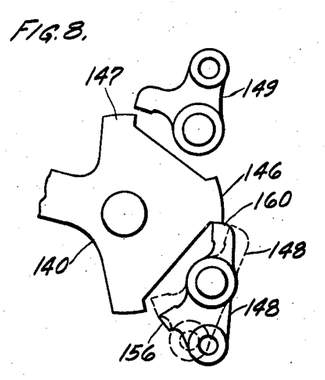
Figure 8 illustrates the return of the mechanism through countershaft reclutching position.

However, as the power shift mechanism operates to shift the gears from the neutral position, it returns the member 149 to the dotted line position shown in Figure 6 for a newly selected gear engagement. The shifting of the gears to this new position results in return of the member 149 from its neutral position shown in dotted lines in Figure 6 and in full lines shown in Figure 7 to the dotted line position shown in Figure 7, which corresponds to the normal driving position of this member. As a result, the stop 158 is released from abutment with the stop 147, and the actuator 140 is thereby released to an extent such as to bring the stop 146 into engagement with the abutment 160 carried at the opposite end of the member 148. This immediately stops the actuator 140 from further clockwise movement, holding the same in a position corresponding to the position shown in Figure 5, in which position the gears of the transmission have been shifted into the selected driving engagement but the countershaft has not as yet been reclutched to the clutch shaft. However, the return movement of the actuator 140 from the position shown in Figure 6 to that shown in Figure 7 results in actuating suitable means at the power shift mechanism for effecting reclutching movement of the countershaft shift rail 37, and as the countershaft is thereby reclutched to the gear 35, the clevis connection 153 returns the member 148 into the position shown in dotted lines in Figure 8, which corresponds to the full line position shown in Figure 4. This withdraws the abutment 160 from the stop 146, thus allowing the clutch pedal to move upwardly and allowing the actuator 140 to move past the abutment 160 and continue in a clockwise direction past the position shown in Figure 8 into the position shown in Figure 4, which results in re-engaging the main clutch and thereby providing for drive of the vehicle through the selected speed in the transmission.

It will thus be apparent that with the interlocking mechanism thus shown, an operator may operate the power shift mechanism to select the desired speed, and then upon initial depression of the clutch pedal, will produce disengagement of the main clutch. This position is shown in dotted lines at 140' in Figure 5. After the main clutch has been disengaged, the abutment 156 prevents further movement of the clutch pedal until the power shift mechanism has declutched the countershaft. This occurs substantially instantaneously so that the operator in depressing the pedal merely has a momentary stop in the position shown in Figure 5, and then proceeds to further depress the pedal to the position shown in Figure 6. At this position, the power shift first shifts the gears to neutral position, which locks the actuator 140 against return movement, thereby holding the clutch pedal fully depressed during the time that the power shift mechanism shifts the gears from the neutral position into the desired driving engagement. As the gears are shifted into this desired driving engagement, the stop member 149 is rotated to release the actuator 140, which then can move into a position controlled by the position of the countershaft clutching mechanism. As it moves to this position shown in Figure 7, the power shift mechanism automatically releases the countershaft clutch for re-engagement, which in turn rotates the stop member 148 out of the path of the abutment 146 to allow the further release of the clutch pedal which will re-engage the main clutch.

With such an interlocking mechanism it is impossible for the operator to effect shifting of gears until the main clutch and countershaft clutch have been moved into declutched position, and these two clutches cannot be re-engaged until after the gears have been shifted to a new driving arrangement. Upon a new gear ratio being selected and the gears being shifted by the power shift mechanism thereto, the mechanism is so designed as to prevent re-engagement of the main clutch until after the countershaft clutch has been re-engaged. It will thus be seen that the power shift provided with the interlock mechanism shown in Figures 4 to 8 will function in such manner as to provide a predetermined sequence of shift operations in the transmission whenever a speed change is desired, and will positively prevent any clashing of gears during such shifting.

Figure 9:
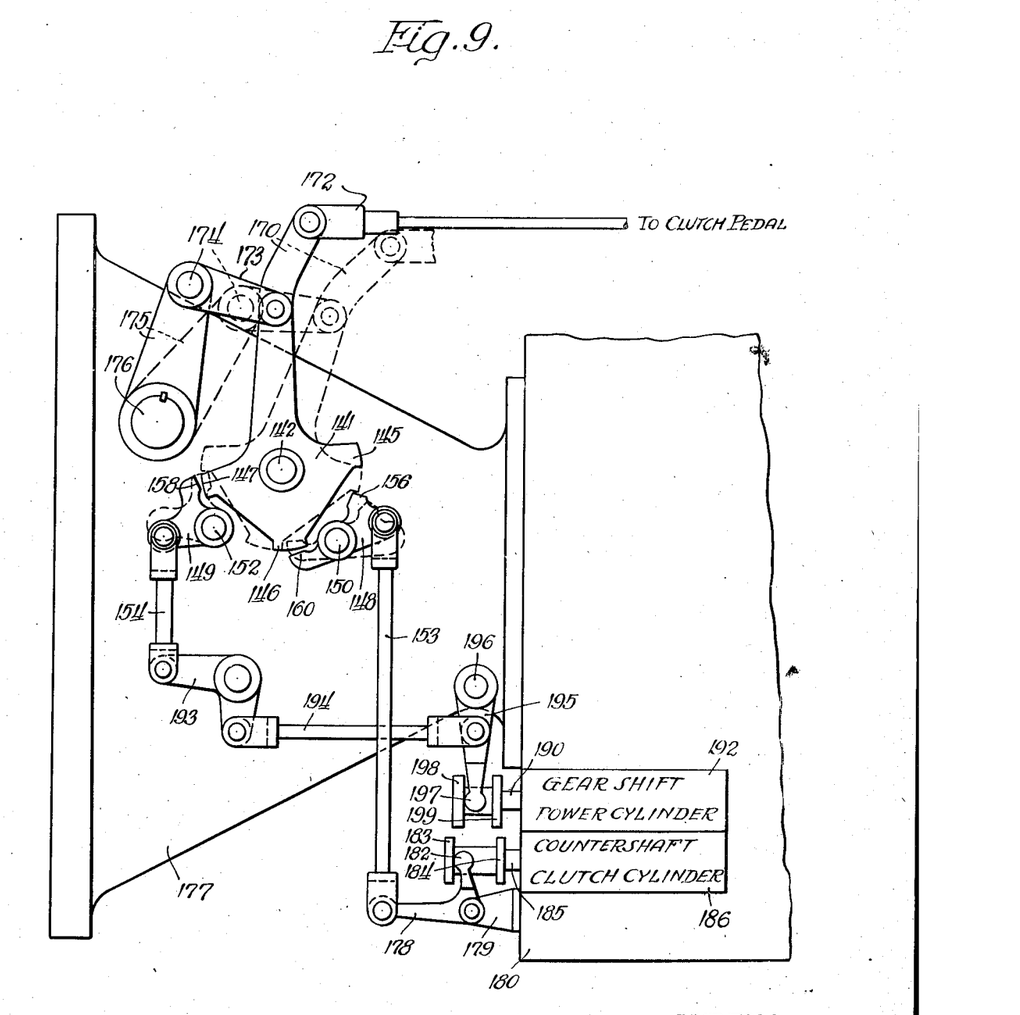
Figure 9 is a somewhat diagrammatic view showing the connections of the interlock mechanisms of Figures 4 to 8 to a transmission assembly.

In Figure 9 we have shown somewhat diagrammatically one way in which the interlock mechanism shown in Figures 4 to 8 might be connected to a transmission assembly employing power shifting means. In this form of the invention the actuator member 141 corresponds to the actuator 140 of Figures 4 to 8, but in place of the arm portion 143, has an elongated curved arm portion 170 which at its upper end has a clevis 172 connecting the same to a clutch pedal or the like. Intermediate its ends the arm portion 170 is provided with a pivotally mounted link 173, the opposite end of which is connected at 174 to the outer end of a clutch throwout lever 175 mounted on the shaft 176. It will be noted that the pivot 142 for the actuator 141 and the shaft 176 are both mounted on suitable bosses on the side of the bell housing 177 which encloses the clutch assembly. Similarly, suitable projections on the side of the clutch housing 177 provide the pivotal supports 150 and 152 for the interlock links 148 and 149.

The interlock member 148 has the rod 153 thereof connected at its lower end to a bell crank 178 mounted on a suitable projection 179 of the transmission housing 180. The opposite end of the bell crank 178 has a finger portion 182 located between spaced stops 183 and 184 of the push rod 185 energized from the countershaft clutch control cylinder 186. When the countershaft clutch is in engaged position, the shaft 185 is in the position shown in Figure 9. Upon operation of the power shift mechanism to disengage the countershaft clutch the shaft 185 moves outwardly of the cylinder, and the stop 184 engages the finger 182 to rock the bell crank 178 in a counterclockwise direction. This results in pulling the stop member 148 downwardly to the dotted line position, thereby removing the abutment 156 from engagement with the abutment 145 and allowing the clutch pedal to be further depressed, it being understood that initial depression of the clutch pedal is limited by the rotative movement of the actuator 141 into position where the stop 145 engages the stop 156. This movement is sufficient to insure disengagement of the main clutch, but no further movement of the clutch pedal can be produced until the countershaft clutch has been disengaged through its power cylinder, after which the stop member 148 is rotated out of position thereby allowing further rotation of the clutch pedal.

When the clutch pedal has moved into the position shown in dotted lines indicating the same, the main clutch and the countershaft clutch have been disengaged, the power shifting means can then operate and such operation results in actuation of the push rod 190 of the gear shift power cylinder 192 which controls the actuation of a clutch sleeve, such as the sleeve 16 shown in Figure 1 or the sleeve 84 shown in Figure 2. Whenever the clutch sleeve in the transmission is in a clutch engaging position, the stop member 149 will be in the position shown in full lines in Figure 9. It will be noted that the rod 154 connected to this stop member has its lower end connected through the bell crank 193 which is connected through the rod 194 to a lever 195 pivotally mounted as at 196 on the clutch housing. The lower end of the lever 195 has a finger portion 197 engaged by the stops or collars 198 and 199 on the shaft 190. Upon shifting movement of the power shift means, the push rod 190 is moved outwardly from the cylinder 192, resulting in clockwise rotation of lever 195, and consequent clockwise rotation of bell crank 193. This results in moving the stop member 149 into position such that the abutment 158 thereof moves beneath the stop 147 on the actuator 141. This effectively locks the actuator 141, and consequently the clutch pedal against return movement until such time as the power shifting means has functioned to move the clutch sleeve in the transmission into gear engaging position, at which time the shaft 190 returns to the position shown thereby withdrawing the member 149 out of locking position.

The clutch pedal and actuator 141 are then conditioned to return, but at this time, due to disengagement of the countershaft clutch, the stop member 148 is in a position such that the abutment 160 is in the path of the stop 146. As a result, the power shift means must re-engage the countershaft clutch before it is possible for the actuator 141 to continue its return rotation. When the countershaft clutch is re-engaged, the collar 183 of push rod 185 engages the finger 182 to return the stop member 148 to the position shown in full lines in Figure 9. This allows complete return of the actuator plate 141 into main clutch re-engaging position.

It will be seen therefore that with the present construction the operation of the clutch pedal, which is necessary prior to shifting of gears in transmissions of the type, results in release of the countershaft from conjoint rotation with the countershaft gear which is engaged with the main clutch shaft. Consequently, the inertia of rotation of the countershaft and its associated gears is released and does not in any way affect the shifting of suitable clutch means on the main shaft, thereby promoting ease of shifting which facilitates quick shifting and eliminates the possibility of clashing of gears.

We are aware that various changes may be made in details of the mechanism shown herein, and we do not intend to be limited only insofar as defined by the scope and spirit of the appended claims.

We claim:

1. The combination, with a clutch and transmission assembly including a clutch pedal, of a countershaft in said transmission having a plurality of gears thereon, one of said gears being rotatably supported on the countershaft, a shift rail parallelling said countershaft, and spring means engaging said rail and released upon initial engaging movement of said pedal for effecting clutching of said one gear to said countershaft for conjoint rotation therewith.

2. In combination, a clutch having a clutch shaft, an actuating pedal therefor, a gear portion formed on one end of said clutch shaft, a transmission including a countershaft, a gear rotatably mounted on said countershaft and in constant meshing engagement with said gear portion, a sliding clutch sleeve on said countershaft movable into and out of clutching engagement with said gear, spring means normally urging said sleeve into engagement, and means controlled by disengaging movement of said pedal to clutch disengaging position for actuating said sleeve against said spring means to move said clutch sleeve out of clutching engagement.

3. Means for facilitating shifting of gears in a change speed transmission having a countershaft, including a freely rotatable gear in constant engagement with a clutch shaft gear, comprising clutch means between said countershaft and said rotatable gear, a pneumatic actuator for said clutch means, and foot pedal operated means for actuating the same.

4. In a transmission, a countershaft having axially spaced gears thereon, one of said gears being rotatable about said shaft and having a clutch tooth portion, said shaft being splined intermediate said gears and having a clutch sleeve axially slidable thereon, a shift rail parallelling said countershaft and having a shifter fork engaging said sleeve, spring means normally urging said rail into position to clutch said gear to said shaft, and pedal-actuated means for shifting said rail into declutching position.

5. The structure set forth in claim 4 further characterized in the provision of synchronizing ring means carried by said sleeve and spring locked thereon for bringing said shaft and gear to the same speed prior to effecting coupling therebetween.

6. In combination, a clutch having an operating pedal and a clutch shaft having a gear portion on one end thereof, a transmission having a main shaft journalled in the end of said clutch shaft and a countershaft having a freely rotatable gear thereon in constant mesh with said gear portion, shiftable means on said countershaft including a parallelly extending offset shift rail for clutching said gear to said countershaft, and lever means connected to said rail and having lost motion connection to said pedal for actuating said shiftable means.

7. In combination, a clutch having an operating pedal and a clutch shaft having a gear portion on one end thereof, a transmission having a main shaft journalled in the end of said clutch shaft and a countershaft having a freely rotatable gear thereon in constant mesh with said gear portion, shiftable means on said countershaft for clutching said gear to said countershaft, and pneumatically actuated means having lost motion connection to said pedal for actuating said shiftable means.

8. In combination, a countershaft, a clutch having a clutch shaft, a gear rotatable on said countershaft and constantly driven from said clutch shaft, a clutch sleeve on said counter shaft for coupling said gear and shaft together for conjoint rotation, spring means normally urging said sleeve into coupling position, a clutch pedal operable in one direction for first disengaging said clutch and subsequently disengaging said sleeve from said gear, and in the opposite direction for initially releasing said sleeve for re-engagement with said gear and subsequently re-engaging said clutch.

9. Interlocking means for a change speed transmission having a countershaft clutch, and a main clutch for the transmission provided with a clutch pedal, comprising an actuator controlled by said clutch pedal, stop means engaging said actuator upon said pedal being depressed past main clutch disengaging position, means for releasing said stop means upon disengagement of said countershaft clutch to allow said pedal to be further depressed, locking means holding said actuator in said further depressed position of said pedal until a new gear ratio is effected in said transmission and then releasing said actuator, said first stop means having means for holding said actuator against further release until said countershaft clutch is reengaged and then releasing said actuator for returning said pedal through main clutch reengaging position.

10. Interlocking means for a change speed transmission having a countershaft clutch, a main clutch for the transmission, a clutch pedal therefor, and gear selecting and shifting means in the transmission, comprising an actuator controlled by movement of the clutch pedal, means including a stop member connected to said countershaft clutch and engageable with said actuator for insuring disengagement of the main clutch prior to disengagement of the countershaft clutch, means for locking said actuator against return movement during actuation of said gear selecting and shifting means, and means preventing return of said actuator and pedal to effect reengagement of the main clutch until after said countershaft clutch has been reengaged.

11. The combination, with a change speed transmission mechanism including a main clutch and operating pedal therefor, a countershaft clutch, and a gear shifting clutch, of interlocking means for predetermining the sequence of movement of said clutches upon depression of said pedal comprising an actuator movable conjointly with said pedal, means for stopping said actuator after said pedal has disengaged said main clutch until said countershaft clutch is disengaged and then releasing said actuator for further movement, and means for locking said actuator in fully depressed pedal position while said gear shifting clutch passes through neutral position and until said last-named clutch is moved to engaged position.

12. The combination of claim 11 further characterized in that said stopping means includes means for holding said actuator in position such that said pedal cannot move to main clutch reengaging position until after said countershaft clutch is reengaged.

13. Interlocking means for a transmission assembly including a main clutch, a gear shifting means, and a countershaft clutch, comprising an actuator adapted to be rotated upon actuation of the main clutch, means for momentarily restraining rotation of said actuator beyond main clutch disengaging position and for releasing said actuator for further rotation upon disengagement of said countershaft clutch, and means for locking said actuator against return until after actuation of said gear shifting means.

14. The combination, with a main clutch, a pedal therefor, a transmission having a countershaft clutch and a gear shifting clutch, and power shifting means for said transmission clutches, of interlock means including an actuator adapted to be rotated by operation of said clutch pedal, means responsive to actuation of said countershaft clutch for limiting rotation of said actuator beyond main clutch disengaging position until said countershaft clutch is disengaged, means responsive to actuation of said gear shifting clutch for locking said actuator against return movement until said gear shifting clutch has been actuated, and means associated with said countershaft clutch responsive means engaging said actuator for preventing engagement of said main clutch until said countershaft clutch has been reengaged.

15. The combination, with a change speed transmission mechanism including a main clutch and clutch pedal, a countershaft clutch, and a gear shifting clutch, of interlock means for predetermining the sequence of operation of said clutches including an actuator responsive to operation of said pedal, means optionally engageable therewith for insuring disengagement of said main clutch prior to disengagement of the countershaft clutch, means for locking said actuator in full clutch disengaging position during actuation of said gear shifting clutch, and means preventing return of said pedal to main clutch engaging position until after said countershaft clutch has been reengaged.

16. The combination, with a transmission mechanism including a main clutch and pedal therefor, a countershaft clutch and operator therefor, and a gear shifting clutch and operator therefor, of interlock means including an actuator controlled by said pedal, control means selectively engageable with said actuator including a locking member controlled by said countershaft clutch operator preventing disengagement of said countershaft clutch prior to depression of said pedal effecting disengagement of said main clutch, and a second locking member engageable with said actuator when said pedal is fully depressed and responsive to actuation of said gear shifting clutch operator into neutral position for locking said other two clutches in full disengaged position, said locking members being selectively controlled by said clutch operators for releasing said actuator to return said pedal from depressed position only upon sequential engagement of said gear shifting clutch, said countershaft clutch, and said main clutch.

17. The combination, with a transmission mechanism including a main clutch and pedal therefor, a countershaft clutch and operator therefor, and a gear shifting clutch and operator therefor, of interlock mechanism for predetermining the sequence of operation of said clutches including an actuator responsive to operation of said pedal, and locking means controlled by said clutch operators and selectively engageable with said actuator upon depression of said pedal for first insuring disengagement of said main clutch, then disengagement of said countershaft clutch, and then locking of said two clutches in disengaged position during actuation of said gear shifting clutch.

18. The combination, with a transmission mechanism including a main clutch and pedal therefor, a countershaft clutch, and a gear shifting clutch, of interlock mechanism for predetermining the sequence of operation of said clutches including an actuator responsive to operation of said pedal, and locking means selectively engageable with said actuator upon release of said pedal from depressed position to insure first that said gear shifting clutch is in engaged position and to then provide for sequential engagement of said countershaft clutch and said main clutch.

19. The combination, with a transmission mechanism including a main clutch anad pedal therefor, a countershaft clutch, and a gear shifting clutch, of interlocking mechanism for predetermining the sequence of operation of said clutches including an actuator controlled by said pedal, means engageable with said actuator and responsive to the position of said countershaft clutch for preventing disengagement of said countershaft clutch prior to movement of said actuator to main clutch disengaging position, and means engageable with said actuator and responsive to the position of said gear shifting clutch for locking said actuator in a position insuring disengagement of said main and countershaft clutches while said gear shifting clutch is in neutral position.

20. The combination of claim 19 wherein said last-named means releases said actuator upon shifting of said gear shift clutch to engaged position, and said countershaft clutch responsive means locks said actuator in main clutch disengaging position until said countershaft clutch moves to engaged position.

LEO A. BIXBY.
ROBERT LAPSLEY.